(No Model.)
S. B. DEARING.
CAR WHEEL.
No. 546,609. Patented Sept. 17, 1895.
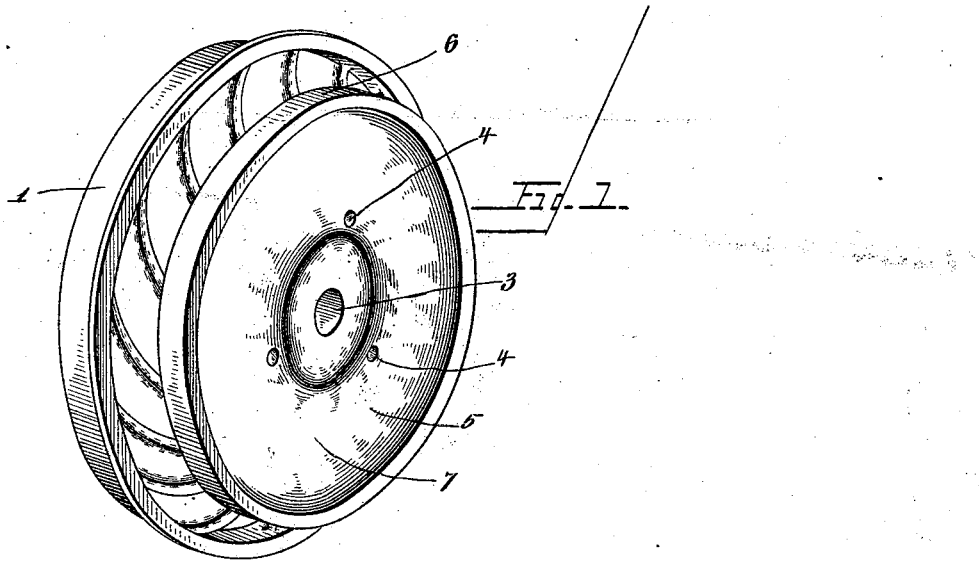
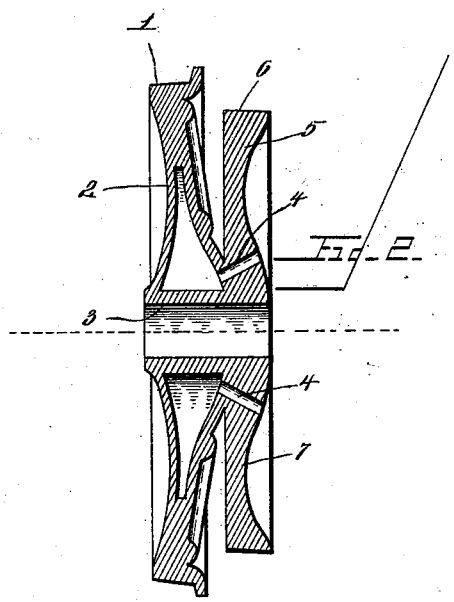
Witnesses
Thos W. Riley
J. B. Owens
Inventor
Samuel B. Dearing
By his Attorneys.
C. A. Snow & Co.

UNITED STATES PATENT OFFICE.

SAMUEL B. DEARING, OF ROANOKE, VIRGINIA.

CAR-WHEEL.

SPECIFICATION forming part of Letters Patent No. 546,609, dated September 17, 1895.

Application filed November 10, 1894. Serial No. 528,403. (No model.)

*To all whom it may concern:*

Be it known that I, SAMUEL B. DEARING, a citizen of the United States, residing at Roanoke, in the county of Roanoke and State of Virginia, have invented a new and Useful Car-Wheel, of which the following is a specification.

This invention relates to an improvement in that class of car-wheels which have for their object to provide a surface upon which the brake-shoe may bear when being applied, instead of bearing upon the tread of the wheel. These devices usually consist in forming an auxiliary wheel or rim which is capable of receiving the pressure of the brake-shoe, and in securing said wheel or rim to the wheel proper or to the axle thereof, so that it will revolve with the wheel and axle and be thereby made capable of performing the function for which it is designed. Now in cases where the auxiliary wheel or rim has been secured directly to the wheel proper it has been practically formed as a part projected out from the wheel proper and made to lie snugly against the same. This construction is disadvantageous in that the heat produced by the friction between the brake-shoe and the auxiliary wheel or rim is transmitted to the wheel proper, thus heating the same, which heating it is the very object of such devices to overcome.

It is, therefore, the object of my invention to produce a car-wheel in which this disadvantage will not be present and one in which a circulation of air will be permitted between the two sections of the wheel and in which the tread of the wheel proper and the auxiliary wheel will be separate and apart from each other. Notwithstanding this separation of the treads, the two wheels are made to be rigidly and immovably joined, and this, preferably, by casting them integral with each other, though it might be possible to cast them separately and rigidly join them, as will be understood.

In the drawings, Figure 1 represents a perspective view of a car-wheel constructed after the manner of my invention; Fig. 2, a vertical section thereof.

The form of wheel to which my invention is best adapted is the hollow cast-iron wheel, and such a wheel is shown in the drawings. There the reference-numeral 1 indicates the tread, and 2 the web.

3 indicates the hub, which is, as usual, cast integral with the other parts of the wheel, and which is perforated to permit the introduction of the axle, all of which is in accordance with the prior state of the art. The wheel is shown to be hollow, as it is usually cast, and 4 indicates the passages which are left therein by the columns of sand which support the sand-core, all of which will be understood.

As one of the important features of the invention is to prevent an overheating of the car-wheel proper, it will be noted at this point that the passages or openings 4 subserve a very important function, and that is by communicating with the interior of the hollow wheel and the outside air the interior of the wheel will be kept constantly supplied with cool air from the outside, which will assist greatly in preventing the wheel proper from becoming overheated. Cast integral with the inner side of the wheel is the auxiliary wheel or rim 5, which is concentric with the hub 3, and which is joined to the wheel proper directly adjacent to the hub, as is best shown in Fig. 2. The inner edge of the auxiliary wheel 5 extends perpendicularly from the line of the axle, which leaves a space between the two wheels, owing to the fact that the adjacent side of the wheel proper slants away from the perpendicular line, or diagonally, at an angle of about fifteen degrees.

The auxiliary wheel is formed with a tread 6, which should be chilled, as is the tread 1, while the said auxiliary wheel is provided with a web 7 similar in function to the web 2—namely, provided to reduce the weight of the wheel. If it is not desired to chill the tread 6, the same may be provided with a steel tire, which will take the place of said chilled surface. The tire may be secured by keys or other suitable means. It will be observed that the wheel 5 is of less diameter than the wheel proper, and the purpose for this is to prevent conflict of the wheel 5 with the track, or with the parts which may project from or adjacent thereto.

In the use of the invention the wheel is mounted as usual upon an axle, and the brake mechanism is arranged so that the tread of the wheel 5 will be engaged by the brake-shoe, as distinguished from the tread 1 of the wheel proper. This will be an effectual means of braking the wheel, and will, at the same time, avoid the necessity of having to apply the brake-shoe to the wheel proper. It will be seen that the heat on the supplemental wheel will not be transmitted to the wheel proper, since it will become dissipated and will die out before it can be transmitted by molecular action to the center or hub of the supplemental wheel and to the wheel proper. Owing to the movements of the car to which the wheel is attached, the air between the wheel proper and the supplemental wheel will be continually changed and the parts fanned, which will greatly help the dissipation of the heat attending the supplemental wheel, and which will kill the same before it can be transmitted to the wheel proper.

The present apparatus now commonly used for braking purposes can be used in connection with the auxiliary wheel by simply shortening the brake-beam, so as to place the brake-shoe opposite the tread of the auxiliary wheel. With this arrangement, in case of accident, whereby the brake-shoe or brake-beam falls, it will not fall upon the rail, as is usually the case, thereby causing a derailment; for the brake-beam being located opposite the auxiliary wheel will be more likely to fall between the rails and not on top of them, thereby lessening the liability of derailment.

Having described the invention, I claim—

A hollow railway car wheel provided at its inner side with a supplemental brake wheel cast integral therewith and at one end of its hub, said brake wheel being smaller in diameter than the wheel proper and provided with a flat tread or periphery, a flat side disposed away from the inner side of the wheel proper to form an intermediate air circulating space that obviates the direct transmission of heat from the direct wheel to the wheel proper, and with a series of passages or openings that communicate with the interior of the hollow wheel and the outside air, substantially as set forth.

In testimony that I claim the foregoing as my own I have hereto affixed my signature in the presence of two witnesses.

SAMUEL B. DEARING.

Witnesses:
W. R. HOUTZ,
JNO. F. SNYDER.